United States Patent [19]

George, Jr. et al.

[11] 4,035,479

[45] July 12, 1977

[54] DELAYED AND SUSTAINED UREA RELEASE COMPOSITIONS

[75] Inventors: Henry H. George, Jr., Berkeley Heights; Sol J. Barer, Clark; Charles L. Smart, Berkeley Heights, all of N.J.

[73] Assignee: Celanese Corporation, New York, N.Y.

[21] Appl. No.: 631,806

[22] Filed: Nov. 14, 1975

[51] Int. Cl.² ............... A61K 31/74; A61K 31/78; A61K 31/17

[52] U.S. Cl. ................................. 424/78; 424/81; 424/322

[58] Field of Search ............... 424/78, 81, 322

[56] References Cited

U.S. PATENT DOCUMENTS

| | | | |
|---|---|---|---|
| 3,629,392 | 12/1971 | Banker et al. | 424/81 |
| 3,660,562 | 5/1972 | Grass et al. | 424/78 |

OTHER PUBLICATIONS

Huston et al – *Journal of Animal Science* vol. 39, No. 3 (1974) pp. 618–628.

*Primary Examiner*—Sam Rosen

[57] ABSTRACT

Delayed and sustained urea release compositions comprising association products with acrylic acid polymers, for ruminant feed supplementation.

5 Claims, No Drawings

DELAYED AND SUSTAINED UREA RELEASE COMPOSITIONS

This invention relates to delayed and sustained release formulations and particularly to compositions for rumen ingestion characterized by controlled and prolonged urea availability. Most preferably, an essentially water soluble acid or neutral salt form of carboxy vinyl polymer is associated with urea to form a selective and specific oral ruminant composition.

In an age of rapidly increasing cost of feed grains and consumer resistance to increased meat cost, measures are needed to effect more rapid and effective weight gain in animals intended for slaughter. Certain approaches, for example the use of diethyl stilbestrol have met with criticism on health and ecological grounds. As a consequence, more basic means for weight gain involving protein synthesis or conversion are of considerable interest, particularly where this may be achieved by the utilization of toxicologically acceptable chemical agents. Wool growth and milk production are also related to protein synthesis as a limiting step.

Urea is now routinely employed as an adjunctive feed element in ruminants such as cattle and sheep for enhanced protein development and resultant improved weight gain. However, direct feeding of urea is limited to not more than about one-third of the nitrogen in the feed and regular diet supplementation requires an increased number of smaller feedings. Urea entering the rumen is rapidly hydrolyzed by bacterial urease to ammonia, and at excessive levels of urea, symptoms of ammonia toxicity including muscular twitching, ataxia, excessive salivation, tetany, bloat and respiration defects may become apparent as ammonia level of peripheral blood exceeds about 1 mg%.

Controlled release of urea in the rumen is accordingly a desirable object, in order to maximize the ingestible proportion of this material toward the end of the weight gain sought.

With controlled levels of available urea supplied to the rumen, ammonia toxicity can be minimized and feed regimen regularized.

Delayed and sustained release of urea is also desirable for controlled availability as a plant nutrient source for lawns and gardens, or general agricultural application.

Polymeric materials have been used heretofore in controlled or sustained release compositions for e.g. human therapeutic agents, as an enteric coating, for example. The operative feature of these systems is the interposition of an insoluble barrier between the active agent and solubilizing body fluids for protection during passage through the stomach, for example.

Thus, U.S. Pat. No. 3,074,852 defines the conditions in the human system for release of a therapeutic agent combined with a cross-linked carboxy vinyl polymer carrier as related to hydration or dissolution of the polymeric carrier under the mildly alkaline conditions found in the intestine. It is reported that these carboxy vinyl polymers on the other hand, as represented by Carbopol 934, do not dissolve or hydrate appreciably in the aqueous acid environment of the stomach.

U.S. Pat. No. 3,619,200 points out, consistently, that for ruminants such as cows, sheep and the like both the rumen and the abomasum pH is on the acid side (rumen fluid may range from a pH of 5.5 to 6.5, and the abomasum evidences a pH of 2.5 to 3.5).

It is of course understood that urea conversion to ammonia by microbial action is accomplished in the rumen, rather than the intestinal region. In fact, only about 30% of the stomach contents proceed through the alimentary canal, some 70% being converted directly into soluble (or gaseous) components and absorbed directly from the rumen or discharged orally. The ammonia generated is used in the synthesis of bacterial and protozoal protein which is subsequently digested in the small intestine of the host.

It is accordingly essential that the release of urea, although controlled and delayed be substantially effected in the rumen, where the microflora adapted for its conversion are available. The present compositions may thus be contrasted with rumen resistant systems based upon polybasic arcylic acid derivatives (reacted, for example with dimethyl aminoethanol) as shown in U.S. Pat. No. 3,619,200 and 3,880,990.

In addition to pH of the medium, it is the physical encapsulation of the soluble material which typically finds emphasis in the present art, particularly for the cross-linked or reacted forms of polyacrylic acid. However, both these materials and the truly water soluble forms although fully diluted in use as colloidal dispersions or in solution have been found by the present invention to be surprisingly effective vehicles for controlled release of urea in the rumen, when prepared as association products therewith.

Without wishing to be bound by an essentially hypothetical elucidation, it appears that the present association product provides urea controllably through a different mechanism involving a more stable complex formation or the like, since the release is essentially independent of solubility, particle size, rates of diffusion etc. conventionally governing controlled release phenomena.

Low molecular weight adducts or inclusion compounds of urea are known per se, and cross-linked high molecular weight polymeric acrylic acids are also shown in U.S. Pat. No. 3,842,022 to be reactive to scavenge urea from the ileum of rats sufficient to control uremic poisoning derivative from oral dosages of urea. However, these precipitates prepared from dilute sols or solutions in vitro are practically impossible to isolate and are distinct in respect of urea release from the association products of the present invention. It is believed that the thermodynamics of the system contribute to the stability of the association product leading to the sustained release levels evidenced.

BRIEF DESCRIPTION OF THE INVENTION

In accordance with the invention, ruminant feed compositions and methods of feeding ruminants involving same are provided wherein urea related assimilation may be achieved through controlled and prolonged release thereof in the rumen by means of an association product of urea and carboxy vinyl polymers such as polyacrylic acid. The reaction is effected at ambient to an elevated temperature to form a product exhibiting a urea release rate constant $U_r$ one-half of at least 2.5 hours, preferably at least 5 hours. A salient feature of the present invention is relatively long-term urea availability at a controlled rate, adapted to the ruminant digestive system. Neither delayed release with sudden and massive availability, nor early high rate release would be suitable for the present purposes. Thus, the association product is uniquely suited to ruminant feed use.

The urea-containing materials of this invention have not been entirely delineated structurally, and are accordingly described without limitation herein as complexes, adducts, clathrates, inclusion compounds, association, addition or reaction products, or even certain conformations of amorphous, solid solutions or semicrystalline lattice configurations. Unlike certain reported urea inclusion products with e.g. fatty acids, the present material does not exhibit characteristics of a discrete crystalline structure. However, release characteristics may suggest a structure wherein the urea is associated about the polymer chains in a regular configuration of relatively high stability.

These association products are readily prepared under selected conditions which provide a further characterization of their nature. Typically, the association product is formed by intermixing the ingredients at a temperature ranging 10° to 145° C., usually from ambient to the melting/decomposition temperature of urea (about 133° C.). An elevated temperature of at least about 100° C. is preferred, in association with high shear mixing conditions. The time of interaction may vary from less than one up to about 15 minutes to an hour or more, depending upon the polymer species and the temperature, but may be readily optimized for any given system.

The urea employed may be of any grade of reasonable purity e.g. technical grade but of course will exhibit the necessary characteristics to qualify for the intended use e.g. ingestion of ruminants ultimately leading to human consumption.

The carboxy vinyl polymers such as polyacrylic acid to which reference is made is inclusive of structure having a significant level of acrylic acid mer units, as the free acid or simple toxicologically acceptable salt form. A minimum of 15–20 mol% of such copolymerized units is ordinarily necessary to achieve effective controlled urea release in an acidic environment. Preferably at least 25 to 30% of the mer units comprise carboxy functionality. Usually, the polymer comprises at least one-third polymerized acrylic acid units, and most preferably at least 50–75%, for rates of release ($U_r$ ½) in the range of 5 to 8 hours. Within limits, the rate of release of urea may be empirically controlled, at constant level of polymer, by selection of acrylic acid level and salt vs. free acid form. Obviously, the release rate will be selected to match the differential retention time of the bolus by cattle and sheep, for example. The ionized or salt form of the acrylic acid polymer may be preferred, for better control over urea release. Thus, for some systems best results have been achieved by the use of the ammonium salt, although of course the alkali metal or amine salts are also suitable.

The urea-polyacrylic acid association product may be supplied to the ruminant in any suitable manner, having regard for the proper feed level for the species in question. Thus, sheep may receive a level of urea within the range of about 14 to 30g/day, and beef cattle a supplement of 225 to 650 g/day. The association product may be supplied as a granular element mixed with silage or cereal grains, or may even be formed into a block or cake, especially in a composition incorporating salts or sugary substance such as molasses to limit intake or improve palatability.

The usual considerations for diet supplementation with urea apply but with greater degrees of freedom as a consequence of the controlled release properties of the compositions. Thus, supplementation will be most effective with a diet low in nitrogen content but high in soluble carbohydrates. Best results are achieved in a mixed diet with protein and non protein sourced nitrogen, where the supplement supplies 25–60% of protein equivalent nitrogen.

The invention is applicable generally to any ruminant species, including antelopes, deer, alpaca, vicuna, llama, giraffes, moose, Irish elk, beefalo or yak but for convenience is referenced principally to the domesticated animals such as cattle and sheep, or less commonly, goats.

DETAILED DESCRIPTION OF THE INVENTION

The carboxy vinyl polymers utilized are well-known, as may be seen from U.S. Pat. No. 2,798,053 disclosing the typical acrylic and methacrylic acid form of polymer, containing 0.75 to 2% by weight of polyalkenyl polyether as a cross-linking agent; or as more specifically shown in U.S. Pat. No. 2,909,462. These carboxy polymethylene hydrocolloids are available as Carbopol 934 or 941 in the carboxyl or free acid form, or as the ammonium salt (Carbopol 960, or 961). Others in the series include Carbopol 935 and 940. Polyacrylate salts with alkali metals are also available e.g. from Aldrich Chemical Co. or American Colloid Co. The carboxy functionality is believed more significant to the bonding phenomena with urea, hence the ionized form is preferred, particularly where acrylic/methacrylic mer values in the polymer are reduced. The acrylic series of monomers represented by the formula $H_2C=CRCOOH$ wherein R is H or lower alkyl constitute the mer units of choice.

These materials are operable in accordance with the present invention whether or not cross-linked and regardless of water solubility, although differences in release rate responsive to these characteristics may be observed. Reten 420, being an acrylamide homopolymer is ineffective, whereas Reten 421 operates suitably to effect controlled release at a 9% acrylic acid level, and almost as well as Reten 423, at a ⅓ percent acrylic acid content. This latter non-cross-linked structure is more effective than the cross-linked Carbopols, again suggesting that free availability of the carboxy functionality should be preferred.

The remaining mer units may be comprised of any otherwise suitable ethylenically unsaturated monomer, inclusive of the monoolefins such as ethylene, propylene, or 1 butene; vinyl esters or ethers; and the like. Hydrolyzed polyacrylonitrile polymers are suitable, comprising various proportions of acrylonitrile, acrylamide and acrylic acid units. Molecular weight of the carboxy vinyl polymer may play some role in the provision of an effective controlled release composition at least at lower levels. It appears that, in general, the base polymer should exhibit a molecular weight of at least about 100,000 up to about 1,000,000, preferably at least 200,000 to 800,000.

The temperature at which the association product is formed may vary from 10° to 145° C. usually from ambient, or room temperature up to the melting point of urea, as aforementioned. However, the temperature effect is not entirely linear, in that competing kinetics for association, apparent loss of carboxy functionality of salt formation apply. For a given system it is only necessary to establish an optimum time for formation and isolation of the desired association product. For the acid form of polymer, higher temperatures of association formation, i.e. above 100° C. appear preferably;

whereas room temperature formation is desired in the case of the salt form. In the case of Carbopol 934/urea (1:9 weight ratio), the compositions may be variously formed, as for example at 100°–133° C. for 1 hour; 80° C. for 24 hours; or 80° C. for 6 hours, and are ranked in that order, for decreasing half life release characteristics. Similarly, compositions of essentially equivalent release characteristics are formed from polyacrylic acid (Aldrich) at 135° C. in 1 hour or at 80°–100° C. in about 23 hours.

It may be desirable in some instances to prepare compositions which exhibit more than one or a complex release rate, by virtue of the presence of additional freely available urea occluded or absorbed in the system; and in the same sense in some cases a reduced urea level may be preferred. Thus, the urea release rate $U_r$ ½ varies essentially linearly with increasing polyacrylic acid levels over the 1–15% weight percent range.

It is important to the proper utilization of the supplied urea that the control over release thereof is appropriately matched to some degree to the typical retention time in the rumen by the species in question. Thus, cattle utilize a rumen retention time of up to 15 to 85 hours, while sheep retain rumen contents up to about 20 hours. Generally nearly complete release of urea is achieved over an 8 to 12 hour period. There is not particularly detrimental effect, within the levels employed, if some of the urea release is delayed in a given case until passage from the rumen to the abomasum or to the intestine, and obviously to some degree the available and solubilized urea may pass in the rumen fluid along the alimentary canal without difficulty. In fact, urea is commonly present as such in the lower intestine and feces as excess ammonia is converted to urea in the liver. The ingestion of carboxy vinyl polymers per se following release of urea is toxicologically acceptable; and advantates have been reported, as in the feeding of swine: see U.K. Pat. No. 1,390,565.

The association product may be fed directly to ruminants as in lick form, diluted to acceptable taste levels, and dosed with molasses or salt, but may also form part of the regular feed, normally inclusive of proteinaceous material. A typical ruminant feedstock supplement, such as 'Purdue 64' based upon dried alfalfa may be thus modified such that the urea equivalent is provided by the association product, and urea levels increased up to three times by virtue of the controlled release properties.

The proteinaceous material may be of plant or animal or synthetic origin. Natural products may include waste meat, fish meals, caseins or yeast or other by-products of the meat industry, dairy industry or fermentation industries. Plant and plant preparations include chaffs, silage, meals, pellets, concentrates or the like formed from grains, nuts, beans and other plant parts, for example lucerne chaff or silage, coconut meal, soya bean meal, peanut meal, corn cob meal, linseed meal, cottonseed meal and lucerne leaf meal. Other feedstocks may include dried beet pulp, dried molasses beet pulp, dried potato pulp, dried citrus pulp, dried brewers grains, corn distillers dried grains, oat mill feed, heat treated soy mill feed, etc. Amino acids or peptides, synthetic or derived from proteins, may also be used.

Of course, essentially nitrogen free feedstock may be used with the urea source of this invention as desired and use in supplementation of sawdust or other synthetic roughage such as cracked oyster shell, newspaper, polyethylene powder, ethylene-propylene copolymers, etc. is envisaged. Conveniently, the association products aid in the pelleting of many feed compositions, affording nontacky pellets and low bin set characteristics.

Ordinarily the urea source of the invention will be employed in essentially dry compositions; however, the delayed release characteristics permit it to be incorporated in liquid feed supplement compositions if desired.

A valuable feature, although ancillary to the main purpose of the invention, is the modification in taste achieved by associating the urea with the carboxy vinyl polymer. This is especially important at high feeding levels of urea, where the feed may otherwise be rejected by the ruminant.

In addition to the food agents commonly part of the feed composition, whether natural or synthetic, it is understood that various adjuvants may be employed such as volatile fatty acids for preservation of grain-based ingredients or formaldehyde and formaldehyde-alkanol systems for their anti-mycotic properties, or lower glycols for freeze resistance.

It is of course possible within the teachings of the art to include biologically active e.g. therapeutic agents of various types in the feed compositions, including agents for the control or eradication of diseased conditions in the ruminant whether related to diet or otherwise, inclusive of aminoacids, antibiotics, trace elements, vitamins, antipyretics, hormones, anthelmintics, antispasmodics, hematics, laxatives, etc.

As noted above the association products of the inventions find utility in ruminant feed compositions, and as a plant nutrient source. The products may also be used to individually coat seeds both as a protective barrier and as a nutrient source; as a resin modifier for the base carboxy-vinyl polymers; and as a soil conditioner.

Although the invention is principally described and exemplified relative to a urea-containing association product, it is understood that similar compositions may be prepared based upon thiourea, or biuret.

The association product referred to in the specification and claims is prepared by interaction of the dry ingredients i.e. in the substantial absence of a liquid medium, in the solid or melt phase.

In order to ascertain precisely and fix quantitatively the degree of control over the release of urea in accordance with this invention, the following test has been employed:

A 2-liter beaker is filled with distilled water, and magnetic stirring means engaged. 25 gm. of common sand is placed in a cellulose (pressed wood pulp) thimble (1 × 6 inches), 2.0 gm. of controlled release sample spread out on the surface of the sand, and then covered with an additional 25 gm. of sand. The thimble is placed in the center of the beaker so that the surface of the sand is at least ½ inch below water level, and supported, as with a ring stand and clamp.

10 ml. samples of water (pH 6.5–7) are removed from the beaker periodically (commonly, one sample per hour) examined spectrophotometrically (absorption in 420 mu band diluted about 10x to a concentration of 50–150 ppm in p-dimethylaminobenzaldehyde: See 'Spectrophotometric Method for Determination of Urea' Watt, George and Chrisp, Joseph, Anal. Chem. 26 (1954) pp. 452–3), and the amount of urea determined. The result may be conveniently plotted as the log of % unextracted urea, for comparison between samples and with a control of pure urea (technical grade).

The test is not intended to reproduce the rate of release in vivo as this will in any event vary with conditions such as pH, but provides a measure of performance and permits samples to be ranked on a performance scale. As set forth herein, the rate of urea release is determined in accordance with this test and expressed in terms of half life of urea release in hours ($U_r$ ½, hrs.)

EXAMPLE I

A.

An association product was formed by premixing in the solid state, without diluents or liquid additives granules of urea and polyacrylic acid of about 370,000 mol wgt. (manufactured by Aldrich Chemical Co.), at a 9:1 weight ratio and charging the homogeneous admixture (total load 50 gm) to a C. W. Brabender Plastigraph providing a high shear mixing zone maintained at a temperature of 120°–130° C. After about 15 minutes, the material was removed and tested for urea release as described above. The solid state association product exhibited a release rate ($U_r$ ½) of greater than 7 hours.

The product could accordingly be fed to beef cattle consistently with their rumen residence time of up to 15 to 85 hours. A second run at 123°–126° C. yielded a material of $U_r$ ½ = 5 hours, for the same reaction time. A low molecular weight species (American Colloid:25000 mol. wgt.), formed into an association product at 132° C. was less effective. ($U_r$ ½ 2.5 hr.).

B.

As a comparison, other polymers were similarly formulated with urea at the same weight level and subjected to high shear elevated temperature conditions for 15 minutes. The resulting products gave the following release values: poly (acrylonitrile), treated at 132°–135° C., $U_r$ ½ 0 hr.; poly(acrylamide), treated at 120°–127° C., $U_r$ ½ = 1 hr.; poly(vinyl stearate), treated at 128° C., $U_r$ ½ = 0 hours).

C.

To resolve whether a viscosity effect was responsible for the results (see U.S. Pat. No. 3,903,295 or 3,576,642), several high viscosity materials, all of Stein Hall manufacture were compounded with urea under similar conditions, with the following results: Jaguar gum 6000 (guar gum), treated at 117° C.: $U_r$ ½ = 1 hr.; Supergel-40 (polypropylene oxide reacted starch), treated at 118° C.: $U_r$ ½ = 0 hr.; Taposol-E (polypropylene oxide reacted tapioca starch), treated at 122° C: $U_r$ ½ = 0 hrs.

EXAMPLE II

A series of Reten resins of varying acrylic acid content were formed as solid state association products with urea (weight ratio urea:resin, 9:1) in the manner of Example I, and then tested for urea release, with the following results:

| Reten Resin | Temp. of Formation ° C. | $U_r$ ½, hr. |
|---|---|---|
| 420 (acrylamide homopolymer) | 132 | .9 |
| 421 (sodium salt ~ 9% acrylic acid/91% acrylamide copolymer) | 120–130.5 | 5 |
| 423 (sodium salt, ~ 33% acrylic acid/66% acryl- | | |

| Reten Resin | Temp. of Formation ° C. | $U_r$ ½, hr. |
|---|---|---|
| amide copolymer) | 122–132 | 8 |

The same relative ranking was secured at a resin level of 5 weight percent. The effect of increasing acrylic acid mer content is apparent, and a comparison with Example I indicates preference for the salt form.

EXAMPLE III

Carbopol resins, polyacrylic acid species of about 200,000 to 300,000 m.w., lightly cross-linked with about 1% of a polyallyl ether of sources (manufactured by B. F. Goodrich) were utilized at varying urea ratios, and the resulting compositions tested for urea release characteristics, as specified hereinbelow:

| Resin | Wt. % | Temp. of Formation | $U_r$ ½, hr. |
|---|---|---|---|
| Carbopol 910 | 1.0 | 126–134° C | 1.8 |
| Carbopol 910 | 5.0 | 123–132.5 | ~3.0 |
| Carbopol 910 | 10.0 | 127–135 | 6–7 |
| Carbopol 910 | 15.0 | 127.5–128 | 7 |
| Carbopol 934 | 1.0 | 130–133 | 1 |
| Carbopol 934 | 3.3 | 127.5—130 | 2 |
| Carbopol 934 | 5.0 | 127–133 | 3 |
| Carbopol 934 | 6.7 | 126.5–129 | 5 |
| Carbopol 934 | 10.0 | 127.5–136 | 5–6 |
| Carbopol 934 | 15.0 | 127.5–128 | >7 |

Thus, for relatively minor proportions of resin significantly delayed urea release may be demonstrated with a release rate consistent with rumen residence times. Similar weight ratio responsive release rates may be demonstrated for association products prepared at room temperature and intermediate temperatures.

EXAMPLE IV

A.

An acrylonitrile polymer was partially hydrolyzed to form a controlled number of acrylic acid mer units as the potassium salt (70%) in association with acrylamide units (30%), the resultant polymer formed into an association product with urea in the manner of Example I, and tested for urea release. Preparations were made at room temperature and at elevated temperature for comparison, and replicated. The following results were obtained.

| Temperature of Formation | $U_r$ ½, hr. |
|---|---|
| A) 132–143 | 4½ |
| 138.5–143 | 3 |
| 136.5–140 | 2½ |
| B) R.T. (~20° C) | 7 |
| R.T. | >7 |
| R.T. | >7 |

Although all materials provided controlled release, those prepared at room temperature gave better performance, suggesting that salt form polymers should be prepared in this temperature regime. Contrariwise, a repeat of the preparation of Example I at room temperature gave acceptable but reduced (5 hrs.) release characteristics, suggesting that free acid form polymers should be prepared in the elevated temperature regime.

A similar polymer, hydrolyzed to 30% acrylic acid level and associated with urea at elevated temperature also gave acceptable results.

B.

An acrylonitrile graft polymer (50% by weight, on a cellulose backbone) was partially hydrolyzed to an acrylic acid (potassium salt) level of 35% (based upon the total weight), compounded with urea at room temperature and about 130° C and the results compared. At room temperature $U_r$ ½ = 2.5 hr., whereas the sample prepared at elevated temperature yielded $U_r$ ½ somewhat greater than 1 hr.

EXAMPLE V

The ammonium salt of poly(acrylic acid) was prepared, compounded in the manner of Example I, then tested for urea release, with the following results:

| % Polymer | Temp. of Formation, ° C. | $U_r$ ½, hr. |
|---|---|---|
| 1 | R.T. | ~1.8 |
| 1 | 66–72.5 | 0 |
| 5 | R.T. | 4 |
| 5 | 63–88 | ~1.8 |
| 10 | R.T. | >7 |
| 10 | 59–74 | 3 |
| 10 | 143–147 | <1 |

The preference for room temperature preparation with the salt form is pronounced, and the excellent release characteristics of the ammonium salt generally evident.

EXAMPLE VI

A series of Carbopol 934 (free acid form) -urea association products were examined for infrared absorbance in respect of ammonium ion, at about 7.15 microns, and carbonyl function, at about 8.2 micron, and the results compared with urea release characteristics. In each case, the samples of poor release characteristics evidenced retained carbonyl functionality and the absence of ammonium absorption, whereas the samples of good release characteristics showed the absence of carbonyl functionality, but ammonium ion absorption.

EXAMPLE VII

A.

Modified ruminant feed supplements are prepared, comprising 280 pounds of cane molasses, 1,020 pounds of dehydrated alfalfa, 208 pounds of bone meal, 70 pounds of salt and an amount of the solid state association product of Example I varied in three levels: 476 pounds, 952 pounds, and 1428 pounds, and fed to sheep. Similar feedstuffs employing a combination of protein and nonprotein nitrogen may be prepared, based upon dried beet pulp, dried molasses beet pulp, dried potato pulp, dried citrus pulp, dried brewers grains, corn distillers dried grains, oat mill feed, corn cob meal, heat treated soy mill feed, etc.

B.

Rations are also prepared comprising 15% ground corn, 78% ground sorghum grain, 5% soybean meal, 1.0% dicalcium phosphate, 0.5% trace mineralized salt, (2000 10 per pound of vitamin A), and 0.5% (based on urea) of the solid state association product of Example 1, and fed to cattle.

C.

Feed compositions including synthetic roughage e.g. based upon alpha-olefin polymers may also be utilized. Such polymeric roughage material may also be physically incorporated with the urea association product. In such an embodiment, Carbopol 934 was plastigraphed with urea (5/95 weight ratio) at 130° C to provide a control composition ($U_r$ ½ = 4 hrs.) which was then compared with compositions similarly prepared comprising 90% urea, 5% Carbopol, and 5% of the following materials, with the indicated release rates:

1. ethylene-vinyl acetate (33⅓ wgt. percent) polymer: $U_r$ ½ = 5 hrs.
2. low density polyethylene: $U_r$ ½ = 6 hrs.

We claim:

1. In feed supplement rations for ruminants comprising an association product of a minor proportion of urea and a major proportion of carboxy vinyl polymer, the improvement which consists of incorporating with said association product a minor effective proportion of an alpha olefin polymer, whereby urea release rates are extended.

2. The feed supplement rations of claim 1, wherein said alpha olefin polymer is an ethylene polymer.

3. The feed supplement rations of claim 2, wherein said alpha olefin polymer is an ethylene-vinyl acetate copolymer.

4. The feed supplement rations of claim 1, wherein the proportion of alpha olefin polymer:association product is at least 95:5 by weight.

5. The feed supplement rations of claim 1, exhibiting a urea release rate (Ur ½) of at least about 5 hours.

* * * * *